US007865433B2

(12) United States Patent
Greer et al.

(10) Patent No.: US 7,865,433 B2
(45) Date of Patent: Jan. 4, 2011

(54) POINT OF SALE PURCHASE SYSTEM

(75) Inventors: Richard E. Greer, Greenville, SC (US);
Thomas W. Epting, Greenville, SC (US)

(73) Assignee: Compucredit Intellectual Property Holdings Corp. II, Las Vegas, NV (US)

( * ) Notice: Subject to any disclaimer, the term of this patent is extended or adjusted under 35 U.S.C. 154(b) by 1210 days.

(21) Appl. No.: 10/924,015

(22) Filed: Aug. 23, 2004

(65) Prior Publication Data
US 2005/0044039 A1 Feb. 24, 2005

Related U.S. Application Data

(60) Provisional application No. 60/497,087, filed on Aug. 22, 2003, provisional application No. 60/573,810, filed on May 24, 2004.

(51) Int. Cl.
G06Q 40/00 (2006.01)
(52) U.S. Cl. ....................................................... 705/39
(58) Field of Classification Search .................. 705/39, 705/41, 1, 1.1, 64; 235/379
See application file for complete search history.

(56) References Cited

U.S. PATENT DOCUMENTS

| 6,405,182 | B1 * | 6/2002 | Cuervo ......................... 705/43 |
| 6,760,710 | B1 * | 7/2004 | Perg ........................... 705/36 R |
| 6,876,971 | B1 * | 4/2005 | Burke ............................ 705/1 |
| 2002/0046185 | A1 * | 4/2002 | Villart et al. .................. 705/64 |
| 2002/0059139 | A1 * | 5/2002 | Evans ........................... 705/40 |
| 2002/0120582 | A1 * | 8/2002 | Elston et al. .................. 705/64 |
| 2002/0128965 | A1 * | 9/2002 | Sacal Y Micha .............. 705/39 |
| 2002/0138424 | A1 * | 9/2002 | Coyle .......................... 705/39 |
| 2002/0145035 | A1 * | 10/2002 | Jones ......................... 235/379 |
| 2003/0130919 | A1 * | 7/2003 | Templeton et al. ............ 705/35 |
| 2003/0140004 | A1 * | 7/2003 | O'Leary et al. ............... 705/39 |

OTHER PUBLICATIONS

Anonymous; "Navistar Services target uptime"; Fleet Owner; V. 93, n7; Jul. 1998; pp. 1 and 2.*
Matz, Deborah L.; and Murray, J. William; "Using payment cards for collection and disbursement"; TMA Journal, V18,n6; Nov./Dec.; pp. 1-5.*
Valerie Block; "First Data Subsidiary Creates Payroll Card for the Bankless"; American Banke, vol. 162, No. 55r; Mar. 21, 1997; pp. 1-2.*
Debit Card News; "Quick Hits: NationsBank Launches a Payroll Debit Card"; Jul. 10, 1998; pp. 1-2.*

* cited by examiner

Primary Examiner—Ella Colbert
(74) Attorney, Agent, or Firm—Sentry Law Goup

(57) ABSTRACT

A merchant can extend credit to a customer by establishing an account which allows the account to be paid off, or significantly paid down, on or after the customer's next payday. The payment can be directly extracted from the customer's bank account. The merchant is provided with a merchant system. The merchant system is used to read or recognize a unique customer identifier device, such as a magnetically encoded or bar-coded customer card, or an integrated chip, micro-computer, manually entered PIN etc., which uniquely identifies an account held by the customer. The merchant device communicates the information to a server system which approves the transaction and cooperatively the merchant system and server system generate a transaction instrument that can be signed by the customer.

11 Claims, 4 Drawing Sheets

| Merchant Name | | | Merchant Name | |
|---|---|---|---|---|
| Merchant Copy | | | Customer Copy | |

Merchant Copy:

| Finance Charge | Amount Financed |
|---|---|
| The dollar amount the credit will cost you. | The amount of credit provided to you or on your behalf. |
| $4.00 | $43.20 |

| Total Sale Price | |
|---|---|
| The total cost of your purchase on credit | |
| $47.20 | |

Itemization of amount financed of $43.20
: $43.20 given to you directly as goods.

Your Payment Schedule:
Number of Payments: ......... 1
Amount of Payment: ..........$47.20
When Payment is due...... 9/14/03

You may pay off amount owed early with no penalty. You will not be entitled to a refund for any part of the finance charge.

See your contract for any additional information about nonpayment, default, and electronic funds transfer notes.

NOTE: Your full payment will be made from your account at _____ bank on Friday, September 14, 2003 according to your electronic funds transfer agreement.

I have received a copy of this statement.

_____   9/8/2003
Signature              Date

70

Customer Copy:

| Finance Charge | Amount Financed |
|---|---|
| The dollar amount the credit will cost you. | The amount of credit provided to you or on your behalf. |
| $4.00 | $43.20 |

| Total Sale Price | Current Available Credit Excluding Finance Charges |
|---|---|
| The total cost of your purchase on credit | |
| $47.20 | $102.80 |

Itemization of amount financed of $43.20
: $43.20 given to you directly as goods.

Your Payment Schedule:
Number of Payments: 1 ......... 1
Amount of Payment:    ..........$47.20
When Payment is due............9/14/03

You may pay off amount owed early with no penalty. You will not be entitled to a refund for any part of the finance charge.

See your contract for any additional information about nonpayment, default, and electronic funds transfer notes.

NOTE: Your full payment will be made from your account at _____ bank on Friday, September 14, 2003 according to your electronic funds transfer agreement.

9/8/2003
Date

Figure 3

POINT OF SALE PURCHASE SYSTEM

CROSS-REFERENCE TO RELATED APPLICATIONS

This application for a United States Patent claims the benefit of the filing date of United States Provisional Application for Patent that was filed on Aug. 22, 2003 having the title of "POINT OF SALE PURCHASE SYSTEM" and assigned Ser. No. 60/497,087, and United States Provisional Application for Patent that was filed on May 24, 2004 having the title of "POINT OF SALE PURCHASE SYSTEM" and assigned Ser. No. 60/573,810.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

This invention relates generally to a computer method and system for creation of individualized financial instruments at the point of sale in retail locations.

Check cashing businesses have been established to advance customers funds based on postdated checks written by the customer. Typically, the customer must avail themselves to such businesses during normal business hours, and must also make their checks payable in relatively large increments, such as, perhaps, multiples of fifty dollars. Once the customer has been paid by his or her employer, the check cashing business presents the check for payment. The business extracts a fee for this service which may be cost prohibitive to some customers. Further, because the customer is provided with cash in relatively large increments, such as multiples of fifty dollars, the customer may actually be required to obtain more cash than their immediate needs require. The customer may thus be tempted to use such excess cash on non-necessities which could again contribute to a lack of funds after the customer's next payday, which, in turn, may then push the customer back towards check cashing businesses, resulting in an unfortunate financial cycle for the customer.

Another item of inconvenience is the fact that the customer must not only be present at such check cashing business during that business's hours, the customer must thereafter travel to an actual merchant's location to purchase the customer's basic needs, such as medicine, groceries, merchandise, clothing, gasoline, utilities, etc.

In the event the customer writes a bad check, then the customer will generally incur significant non-sufficient funds (NSF) fees by his or her bank, in addition to those penalty fees the customer may be required to pay to merchants and other parties to whom non-sufficient funds checks were written.

The foregoing problems are especially prevalent with those customers who have, or have had in the past, bad credit, or cannot obtain credit due to low income and/or too few assets.

Accordingly, there exists a need for a mechanism by which a customer or other customer can purchase basic needs items, such as medicine, food, fuel, etc., from a merchant, even in those times when the customer may not have funds to pay for those items, with the understanding that the merchant will be paid back on or after the customer's receipt of his or her next paycheck.

SUMMARY OF THE INVENTION

Generally, the present invention provides a method and system for a merchant to extend credit to a customer by establishing an account to do so, with such account being paid off, or significantly paid down, on or after the customer's next payday, directly from the customer's bank account. The merchant, merchant's agent, financial institution, utility company, rental company, service provider, etc. (collectively referred to herein generally as the "merchant") is provided with a system referred to herein as the "merchant system." The merchant system is used to read or recognize a unique customer identifier device, such as a magnetically encoded or bar-coded customer card, or an integrated chip, micro-computer, etc., which uniquely identifies an account held by the customer. Alternately, the customer's personal identifier could be entered manually based on a personal identification number (PIN) or other identification device or means. For the sake of convenience, such customer identifier devices or means will be referred to collectively herein as "keys" or "cards."

When a customer wishes to charge an item to the account, such as, perhaps, when the customer is low on funds, the customer presents the card to the merchant system, and the merchant system, after reading such information from the card, the merchant system sends such information to a server system with a request that the service system access databases containing information about the customer, such as the customer's name, social security number, payment plan, pay dates, credit limit, amount of credit available, current amount owed, and other information databases that may be required and/or used by the merchant or required by government regulations. The server system uses the customer information to issue an approval, or disapproval, as the case may be, back to the merchant system regarding the merchant's transaction with the customer.

If the purchase, i.e., the transaction, is approved, the server system also calculates and transmits to the merchant system applicable required federal and state "Truth in Lending" disclosure information including, finance charges, amount financed, transaction fee, total payments, payment schedule, and the annual percentage rate (APR) of interest, if necessary. If desired, the server system can also calculate a variable annual percentage rate (APR) based on the date of the transaction and the date of payment.

The server system further determines the payment schedule for the customer, to which the customer would have already agreed via a contract earlier entered into between the customer and the merchant and incorporated as a part of the new credit sale. This contract would address and disclose transaction fees imposed by the merchant on the customer on a per transaction basis. It is to be understood, however, that instead of or in addition to the transaction fee, any interest charge could be imposed on the customer by the merchant based on the amount of the transaction. The server system determines the actual calendar dates on which payment is to be made by the customer, and the actual payment method, such as by electronic funds transfer (EFT), automated check clearinghouse (ACH), cash, check, at the merchant's location, or by other means.

Briefly, the server system converts and formats a transaction document, i.e., financial instrument, which is ultimately printed by the merchant system. Using the information discussed above, such financial instrument is created, printed out, and ultimately signed by the customer at the point of sale (POS).

The server system communicates with the merchant system to generate the financial instrument, which, in one preferred embodiment, is printed at the actual merchant point of sale, which, for example, could be the checkout stand where the transaction is being made. Such financial instrument could actually be printed by the same printer used to print merchandise receipts, or, could be printed out at an auxiliary printer, such as may be used to print coupons at checkout stations, automated and/or self-checkout configurations, or at prepaid phone card terminals, etc.

Through cooperation of the merchant system and the server system, the financial instruments created are purchase transaction-initiated and are stand-alone documents ready for the customer's signature at the point of sale for the amount of transaction, together with any transaction fees. Such financial instrument can be configured to be in compliance with applicable federal, state and local requirements for such transactions.

It is noted that the merchant system and the server system could be co-located on the same premises, or could be separated, with communications between the merchant system and server system being handled by ordinary telecommunication lines, the world wide web (WWW), cellular telecommunications systems, satellite telecommunications systems, radio frequency systems, infrared systems, microwave systems, optical systems, or other systems suitable for conveyance of information.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 3 provides an exemplary embodiment of a financial instrument 70 that may be created in one embodiment of the present invention.

DETAILED DESCRIPTION OF EMBODIMENTS OF THE INVENTION

Figure 1:
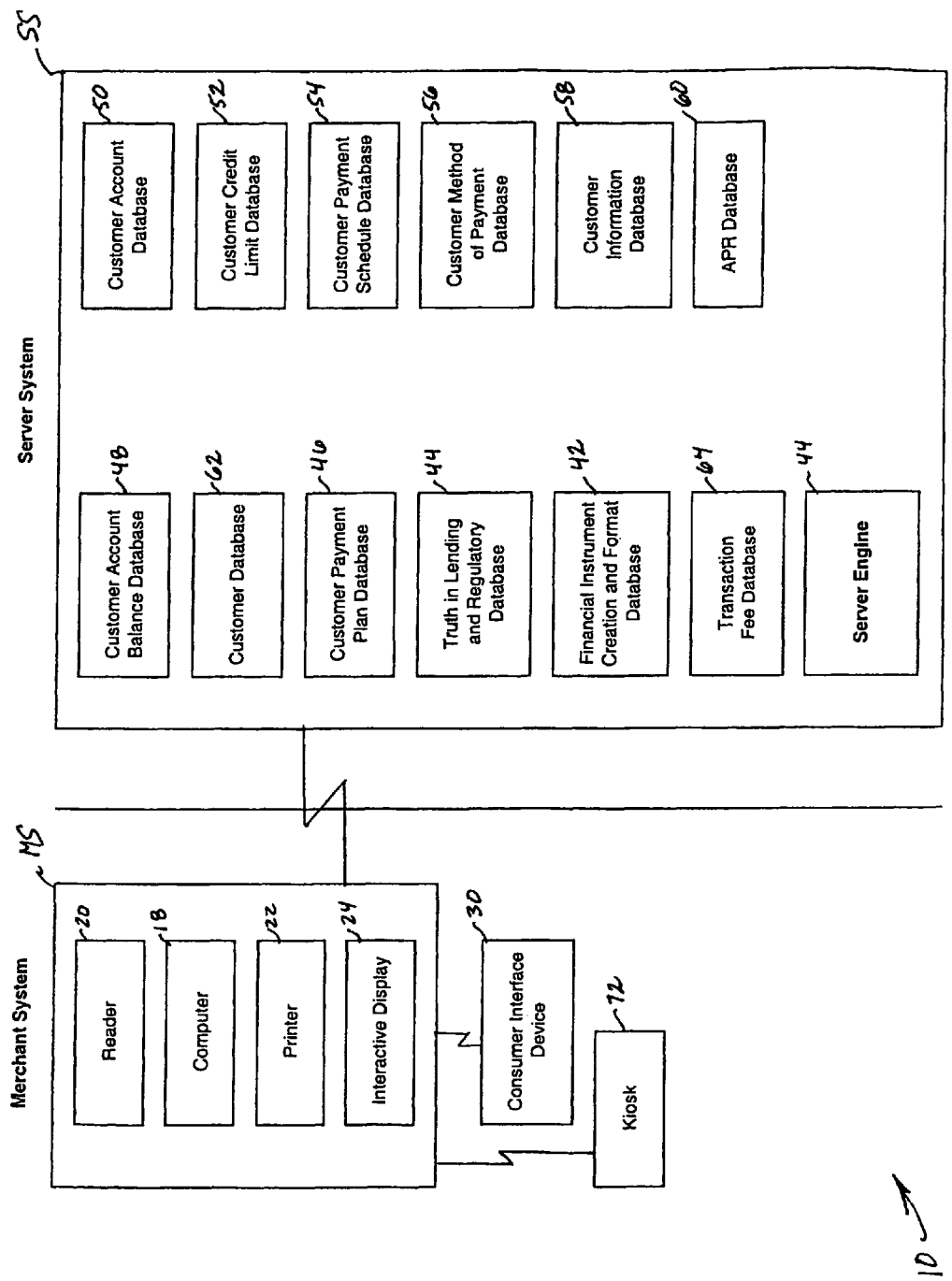
FIG. 1 is a block diagram illustrating an embodiment of the present invention.

The accompanying drawings and the description which follows set forth exemplary embodiments of various aspects of the present invention. However, it is contemplated that persons generally familiar with financial and credit information and transactions will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the point of sale purchase system of the present invention is indicated generally in the figures by reference character 10.

The present invention provides a method and system for creation of unique purchase decision initiated financial instruments for point of sale transactions, which could be in the wholesale, retail, e-commerce, business-to-business, etc. arenas, and includes a combination of computer hardware and software for allowing the creation of new, individualized financial instruments, including loan documents, at the point of sale. These financial instruments may be used for the amount of the transaction or for a combination of transactions, or for establishment of new accounts and for issuing instant credit. The financial instruments often will be between a customer and a merchant or his or its agent, which can include banks, other financial institutions, or the like.

FIG. 1 is a block diagram illustrating an embodiment of the present invention. This embodiment supports a point of sale purchase transaction system including a merchant system and a server system. The merchant system, generally MS, is preferably computer-based, and also includes a reader 20, a printer 22, and/or an interactive display 24 interfaced with the computer 18. The reader 20 is used to read a customer interface device, such as a card, which can be encoded with magnetic, barcode, optical, etc. encoding, or could be a chip or microcomputer capable of storing identifying information about the customer. It is to be understood, however, that the customer interface device, or, referred to herein generally as a key, or, card 30, could be of various configurations, and, could be bypassed altogether by the customer, with the customer simply entering a personal identification number (PIN) together with a user ID, or through use of some other identification means, such as a driver's license, together with an identification number.

The reader 20 is preferably connected to the computer 18 and transmits information to the server system, generally SS. The printer 22 or interactive display 24, which are preferably connected to computer 18, could, instead, be connected directly to the server system SS, if desired, and serve to printout and/or display uniquely tailored financial instruments 70. FIG. 3 provides an exemplary embodiment of a financial instrument 70 that may be created in one embodiment of the present invention. In FIG. 3, the financial instrument 70 includes a portion for the merchant 74, and a portion for the customer 76. It is to be understood that the financial instruments illustrated in FIG. 3 are representative only, and that the present invention is not limited to such examples. The financial instruments could take on a variety of different configurations, appearances, and styles, without departing from the teachings of the disclosure.

Merchant system MS and server system SS could be co-located on the same premises, or could be separated altogether in different locations. Communication is enabled between merchant system MS and server system SS, such as through the use of conventional telecommunications systems, local area networks, wide area networks, point-to-point dial-up connections, or through radio frequency systems, microwave systems, infrared systems, optical systems, satellite systems, the World Wide Web (WWW), etc. Merchant system MS and server system SS may each comprise any combination of hardware or software that allow interaction between the merchant system MS and the server system SS, and such software and hardware will be apparent to one of ordinary skill in the art.

Server system SS includes a server engine 40, a financial instrument creation and format database 42, a Truth In Lending and regulatory database 44, a customer payment plan database 46, a customer account balance database 48, a customer account database 50, a customer credit limit database 52, a customer payment schedule database 54, a customer method of payment database 56, a customer information database 58, having the customer's personal information, such as the customer's name, address, employer name, social security number, and personal information, an annual percentage rate (APR) database 60, a customer database 62, and a transaction fee database 64.

The server engine 40 receives requests from the merchant server MS and provides responses back to the merchant server MS. Requests from the merchant server MS would indicate that the customer is requesting a credit sale. The customer database 62 contains customer information for various customers who have entered into an agreement with the merchant. The agreement between the customer and the merchant, among other things, can set forth the terms of the relationship, including transaction fees, the definition of a transaction, schedule payment dates, method of payment, covenants to pay, fees charged for returned checks or denied charges/transfers, credit limits, etc. The agreement may also include a pre-authorization for electronic funds transfer payments. In an exemplary embodiment, the fees charged for a transaction can be based on the amount of credit being extended. Table 1 provides an example of a fee structure that could be applied in the present invention.

TABLE 1

| Credit Amount | Fee Amount |
| --- | --- |
| $.01-$9.99 | $1 |
| $10.00-$19.99 | $2 |
| $20.00-$29.99 | $3 |
| $30.00-$39.99 | $4 |
| $40.00-$49.99 | $5 |

The agreement between the customer and merchant may be a simple agreement or a more elaborate printed form, or could be provided to the customer in electronic form via email or at the point of sale, with the customer's signature being captured electronically and stored electronically.

The customer method of payment database 56 contains information regarding the customer's agreed upon methods of payment, be it electronic funds transfer (EFT), automated check clearinghouse (ACH), payment by cash, check, debit card, credit card, or some other means.

The customer payment schedule database 54 includes information regarding the date on which the customer normally receives his or her paycheck. The customer credit limit database 52 contains information regarding the credit limit which has been assigned to a particular customer, and the customer account balance database 48 contains information on the customer's then-current balance owed (or owed to the customer by the merchant, in the event the customer has a credit balance). The customer account database 50 contains information regarding the customer's account number, account status, such as active, inactive, closed, etc. The Truth in Lending and regulatory database 44 contains information regarding applicable truth in lending federal, state and local disclosure information regarding finance charges, amount financed, total payments, payment schedule, and annual percentage rate. This database may also include other information required by individual jurisdictions for completion of financial documents and miscellaneous information which may be required by the merchant or government regulatory body. The transaction fee database 64 provides the appropriate transaction fee to be charged for the particular transaction.

The financial instrument creation and format database 42 contains information regarding the creation of financial instruments for execution by the customer in a point of sale transaction, and also for formatting the financial instrument 70 (FIG. 3) for printing out on a printer 22 for execution by the customer. Alternately, the financial instrument 70 could be presented in a graphical or digital form, which the customer would execute by signing a touch screen-type display. This could find particular use in automated and/or self-checkout stations used by some merchants. The format of the actual financial instrument format may be held in template form, physically or electronically, in the merchant system MS, server system SS, or terminal, or held in the printer 22 or display 24.

In another alternate embodiment, the customer could elect to simply have the financial instrument forwarded to a specified email address for receipt by the customer at that address. The server system SS could, using the server engine, also, if desired, transmit reminder emails to the customer reminding the customer that on a date certain, the customer's account will be debited in order to payoff all or a portion of the customer's balance of the account with the merchant.

Figure 2A:
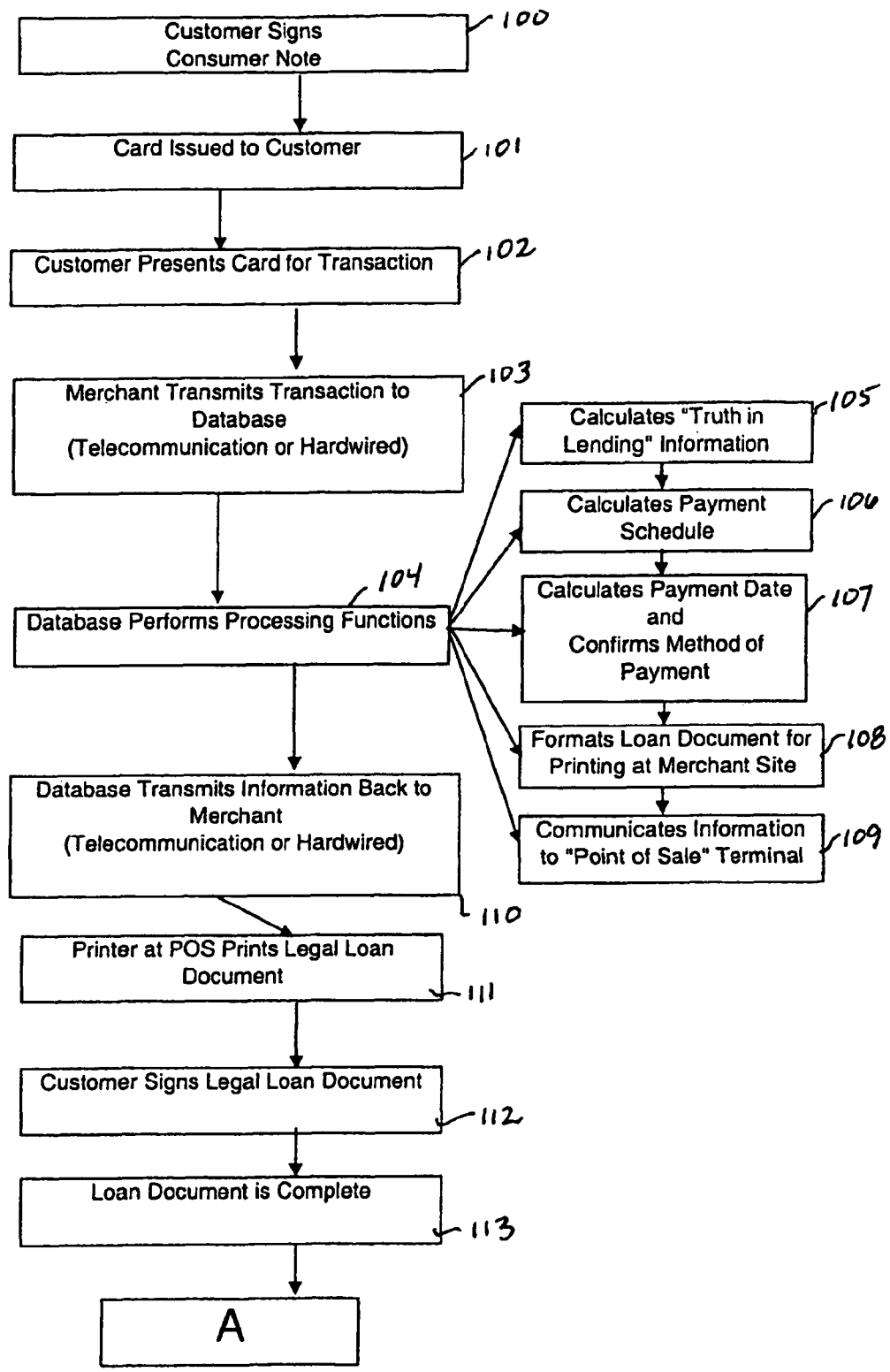
FIGS. 2A and 2B are flow diagrams of a routine for generating unique purchase decision initiated financial instruments for a point of sale purchase system constructed in accordance with the present invention.
Figure 2B:
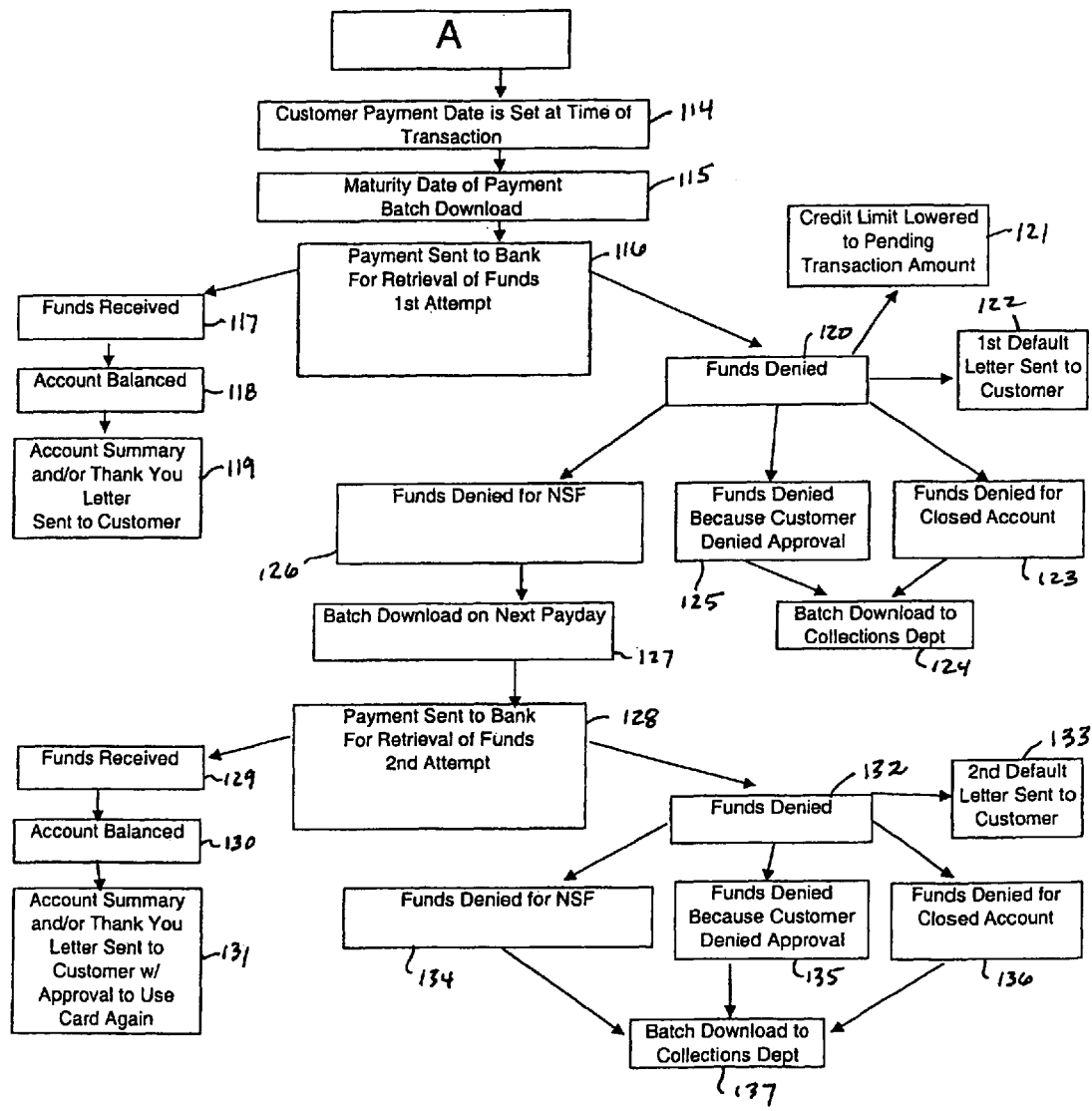

FIGS. 2A and 2B illustrate a flow diagram of a routine for creating point of sale financial instruments in accordance with the present invention. At the outset, to enable the server system SS to be operational for a particular customer, the basic information will need to be inputted into the server system SS pertaining to the customer. This information can be keyed in by an operator, based on the information provided to the merchant, or its designee, by the customer on an agreement, or could be inputted into a computer directly by the customer at a website provided by the merchant, through use of the world wide web.

Alternately, a merchant could provide a kiosk 72, or other data entry point, on-site for use by the customer to complete an application for a merchant credit account with the particular merchant.

In step 100, the customer provides the information and agrees to the terms of the merchant agreement. In response, the merchant, in step 101, issues a card or other customer identifier device to the customer. In step 102, the customer presents the card or other device for a transaction with the merchant. The merchant transmits the transaction, in step 103, to the server system SS, and steps 104, 105, 106, 107, 108 and 109 involve use of software to process the information drawn from the databases 42, 44, 46, 48, 50, 52, 54, 56, 58, 60, and 62 of the server system SS. The server system SS, after processing such information, forwards a response back to the merchant server MS in step 110 indicating whether the transaction is approved or disapproved. If the transaction is approved, then printer 22 or other display device 24 is used to generate a financial instrument 70 at step 111 for execution by the customer, which takes place at step 112. Thus, at step 113, the financial instrument is complete. Accordingly, the merchant system MS and the server system complete a legally binding stand-alone credit instrument initiated by the customer, with the only input having been the customer's identifier and the transaction amount.

On the financial instrument, the customer is provided with a payment date, which is calculated at the time of the transaction, as shown in step 114.

It is to be understood that in those situations where the server system SS is co-located on the premises with the merchant system MS, it may be desirable to, instead of having a communication link established between the server system SS of a number of merchant locations with a central server system, which continuously monitors the customer's use of his or her account, provide an in-store server system (having both the merchant system MS and server system SS on the same premises). This configuration would download all the information it receives during a day's transactions to a central, off-site server, and could also receive information updating the customer's account. Thus, if the customer had made multiple credit transactions at various ones of the merchant's stores, this information could be tabulated and accounted for at the end of the day by a server system SS which is located off-site.

Turning to FIG. 2B, in step 115, the maturity date of the payment is batched downloaded and sent (step 116) to the customer's bank for retrieval of funds, in the case of electronic funds transfer (EFT) and automated check clearinghouse (ACH) transactions. If funds are received, then steps 117, 118, and 119 are pursued.

If funds are declined, as shown in step 120, then step 121 occurs to lower the credit limit of the customer's account, and a first default letter is sent to the customer in step 122. If the funds are denied due to a closed account, then such information is downloaded and sent for collections purposes (step 124), as indicated in step 123. Likewise, if funds are denied because a customer is denied approval (step 125), then such information would be transferred for collections.

If the funds were denied for non-sufficient funds (NSF), as shown in step 126, then on the customer's next payday or other pre-selected date (step 127), a second attempt will be made for retrieval of the funds, as shown in step 128. If funds are available, then steps 129, 130, and 131 are followed, with the customer's account being balanced.

If funds are again denied (step 132), then a second default letter is sent to the customer (step 133), and if the funds are denied for non-sufficient funds (step 134), because the customer is denied approval (step 135), or because the customer's account was closed (step 136), then such information is transferred for collections (step 137).

From the foregoing, it can be seen that a merchant, or its designee, and a customer completes an application or customer note for credit. The customer indicates a payment mechanism, such as by check, by cash, or by electronic funds transfer (EFT) or automated check clearinghouse (ACH). After completing the application, the customer, as an incentive, may be given an instant credit good for an agreed amount of credit for merchandise.

At the point of sale, the customer executes a financial instrument, such as a credit or loan agreement, which has been generated by the merchant system MS and/or server system SS. The financial instrument is preferably in compliance with applicable laws and regulations, and its generation is begun as follows:

The customer presents his customer identifier device, which may be a card, which has been issued by the merchant or the merchant's designee. The device has the customer's name and account number and other information stored on a magnetic strip, bar code, imbedded chip, computer, etc. The merchant at the point of sale ascertains the information by, in the case of a card, swiping the card over a reader, or simply by manual input of the card number, customer's name, or other identifying method.

The merchant uses a merchant system MS to transmit information concerning the customer and the amount of the transaction to the server system SS, which may be located at the merchant's location, or at an off-site location. The databases within the server system SS include the following information:

name of customer;
social security number of customer;
payment plan for customer;
the date the payment plan indicates payment will be made;
credit limit for the customer;
amount of credit available;
current amount owed by customer;
other information required by individual states or jurisdictions for completion of financial documents; and
miscellaneous information that may be required by the merchant or a government regulatory body.

The server engine is programmed with software that takes the information from the point of sale at the merchant's location and performs the following functions:

determines and calculates necessary federal and state "truth in lending" disclosure information including finance charges, amount financed, transaction fee, total payments, payment schedule, and an annual percentage rate of interest, if necessary. The software can, if necessary, calculate variable annual percentage rates, based on the date of the transaction and the date of payment, which may vary from financial instrument to financial instrument, and transaction to transaction;
determines the payment schedule for the payment plan agreed to in the contract;
determines the actual date or dates of payments to be made by the customer and the method of payment;
formats the financial instrument using the information computed above for signature by the customer at the point of sale; and
communicates with the point of sale terminal (which may be a separate terminal for these transactions or any printer capable of printing the contract, or display capable of displaying an electronic form of the contract, or the cash register, prepaid phone card terminals, or other terminals or stations).

The result of the foregoing is thus a legal, stand-alone financial instrument, one possible example being shown in FIG. 3 (ready for the customer signature at the point of sale, for the amount of the transaction, or combination of transactions). In the instance where a customer may be granted instant credit, before even having his or her application could be used.

A unique feature of the present invention is that the system is initiated by the customer. The customer, using his or her customer identifier device, such as a card, key, PIN number, etc. presents such at the point of sale, which initiates the process which ultimately results in the generation of uniquely tailored financial instruments. These financial instruments are developed, as discussed above, through accessing of data from specified databases, within a server system, and by manipulation of such data.

While the present invention has been discussed in terms of a customer and merchant relationship, it is to be understood that the present invention could be easily adapted and used between businesses, in a so-called "B to B" relationship. It is to be further understood that the present invention contemplates production of financial instruments which could be either negotiable or non-negotiable instruments. While the financial instruments discussed here have been referred to in certain instances as loans or credit documents, they could also be advances, deferred payment documents, layaway documents, etc.

The present invention calculates, formats, and prints out Truth in Lending information and the appropriate transaction fee at the point of sale and, in one preferred embodiment, provides a date certain in which payment will be drafted from the customer's account through an electronic funds transfer.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the present disclosure.

What is claimed is:

1. A method of initiating and closing a financial transaction at a point of sale, the method comprising the steps of:
   entering into an agreement between a customer and a merchant for a merchant credit account to be used by the customer to make a credit purchase at a point of sale which is subject to a financial instrument, the agreement specifying at least schedule payment date information and at least one method of payment for the credit purchase;
   providing the customer with a customer identifier, the customer identifier being associated with the customer and with the agreement entered into by the customer;
   receiving the customer identifying information in conjunction with the initiation of the credit purchase by the customer;
   sending a financial transaction authorization request, along with the received customer identifier to a server system;
   extracting information related to the customer identifier that is stored in a database;
   generating an authorization for the credit purchase initiated by the customer based on the information stored in the database;
   receiving the authorization from the server system at the point of sale;
   generating and formatting a financial instrument and presenting the financial instrument to the customer at the point of sale, the financial instrument including a payment due date calculated at the time of the credit purchase and based at least in part on the customer information, the financial instrument being provided to the customer at the point of sale as a step in the credit purchase and requiring the customer to accept the financial instrument to close the credit purchase;
   obtaining acceptance of the financial instrument by the customer; and
   applying a transaction fee for closing the credit purchase;
   wherein the step of generating and formatting the financial instrument and presenting the financial instrument to the customer at the point of sale comprises printing the financial instrument to a printer located at the point of sale.

2. The method of claim 1, wherein the step of entering into an agreement between the customer and the merchant comprises the customer providing initial funds accessible by the merchant.

3. The method of claim 1, wherein the step of entering into an agreement between the customer and the merchant comprises establishing a direct deposit for the customer's paycheck and access by the merchant.

4. The method of claim 1, wherein the step of providing the customer with the customer identifier comprises providing the customer a customer identifier device having a personal identification number.

5. The method of claim 4, wherein the customer identifier device comprises a card with a magnetic strip on which the personal identification number is stored.

6. The method of claim 1, wherein the step of providing the customer with a customer identifier comprises issuing the customer a bar-code customer card.

7. The method of claim 1, wherein the step of generating an authorization further comprises determining that the customer has sufficient funding in the merchant account for the financial transaction.

8. The method of claim 1, wherein the step of generating a financial instrument further comprises the step of generating an executable instrument for the customer to sign, the executable instrument including a payment due date.

9. A method of initiating and closing a financial transaction at a point of sale, the method comprising the steps of:
   entering into an agreement between a customer and a merchant for a merchant credit account to be used by the customer to make a credit purchase at a point of sale which is subject to a financial instrument, the agreement specifying at least schedule payment date information and at least one method of payment for the credit purchase;
   providing the customer with a customer identifier, the customer identifier being associated with the customer and with the agreement entered into by the customer;
   receiving the customer identifying information in conjunction with the initiation of the credit purchase by the customer;
   sending a financial transaction authorization request, along with the received customer identifier to a server system;
   extracting information related to the customer identifier that is stored in a database;
   generating an authorization for the credit purchase initiated by the customer based on the information stored in the database;
   receiving the authorization from the server system at the point of sale;
   generating and formatting a financial instrument and presenting the financial instrument to the customer at the point of sale, the financial instrument including a payment due date calculated at the time of the credit purchase and based at least in part on the customer information, the financial instrument being provided to the customer at the point of sale as a step in the credit purchase and requiring the customer to accept the financial instrument to close the credit purchase;
   obtaining acceptance of the financial instrument by the customer; and
   applying a transaction fee for closing the credit purchase;
   wherein the financial transaction is a point of sale purchase and the step of generating a financial instrument further comprises the step of generating a merchant portion and a customer portion, the merchant portion including the identification of the sale price, the finance charge and the amount financed and the customer portion including all of the information on the merchant portion, along with an available balance identification and payment due date.

10. The method of claim 9, wherein the step of obtaining acceptance of the financial instrument comprises obtaining a signature from the customer.

11. The method of claim 9, wherein the financial instrument is delivered in electronic form and the step of obtaining acceptance of the financial instrument comprises electronically capturing the signature of the customer.

* * * * *